Aug. 26, 1952
C. W. KEUFFEL
2,607,994
LEVEL TRANSIT
Filed Dec. 10, 1947
3 Sheets-Sheet 1
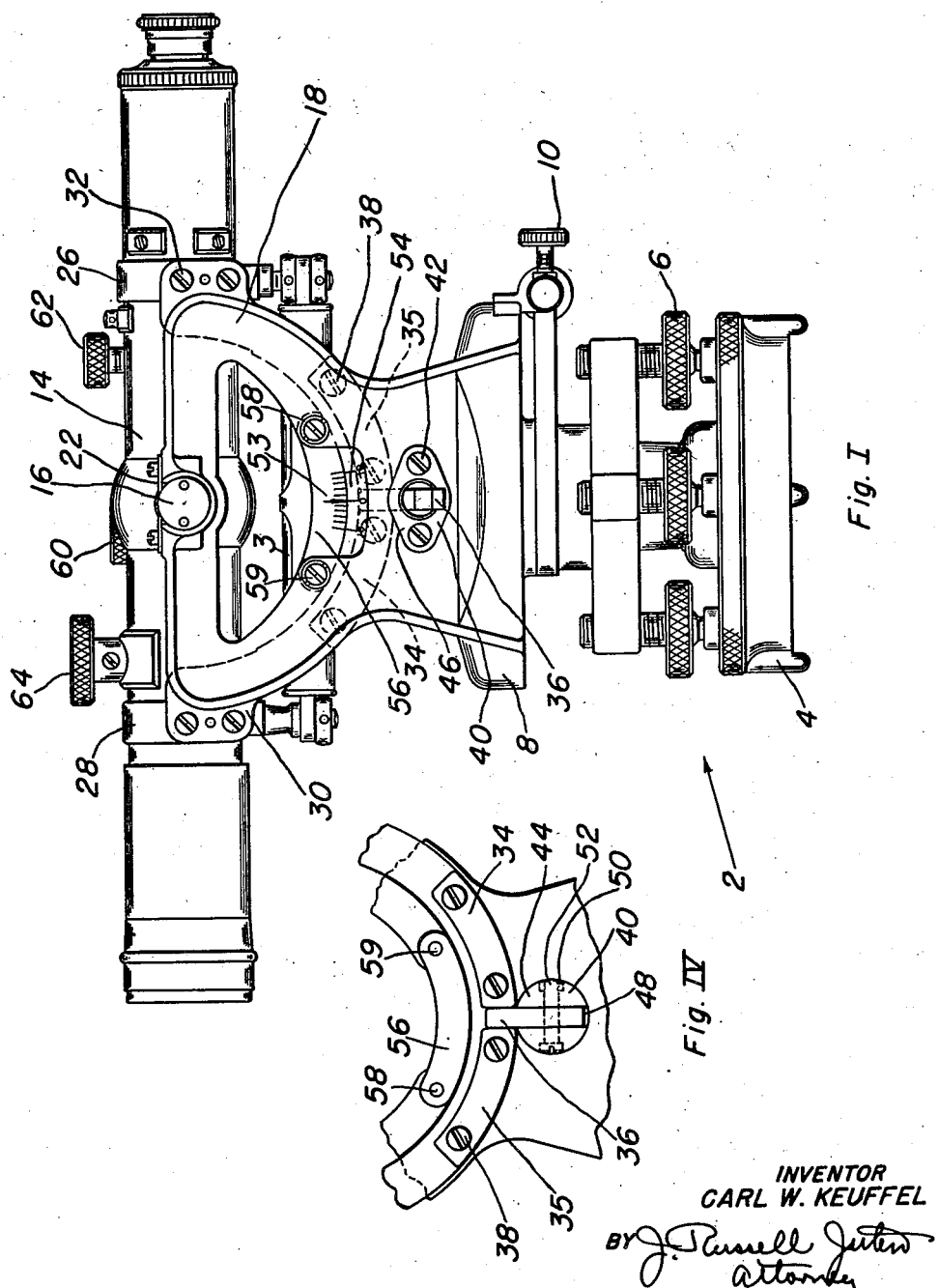
INVENTOR
CARL W. KEUFFEL Aug. 26, 1952　　　C. W. KEUFFEL　　　2,607,994
LEVEL TRANSIT
Filed Dec. 10, 1947　　　　　　　　3 Sheets-Sheet 2
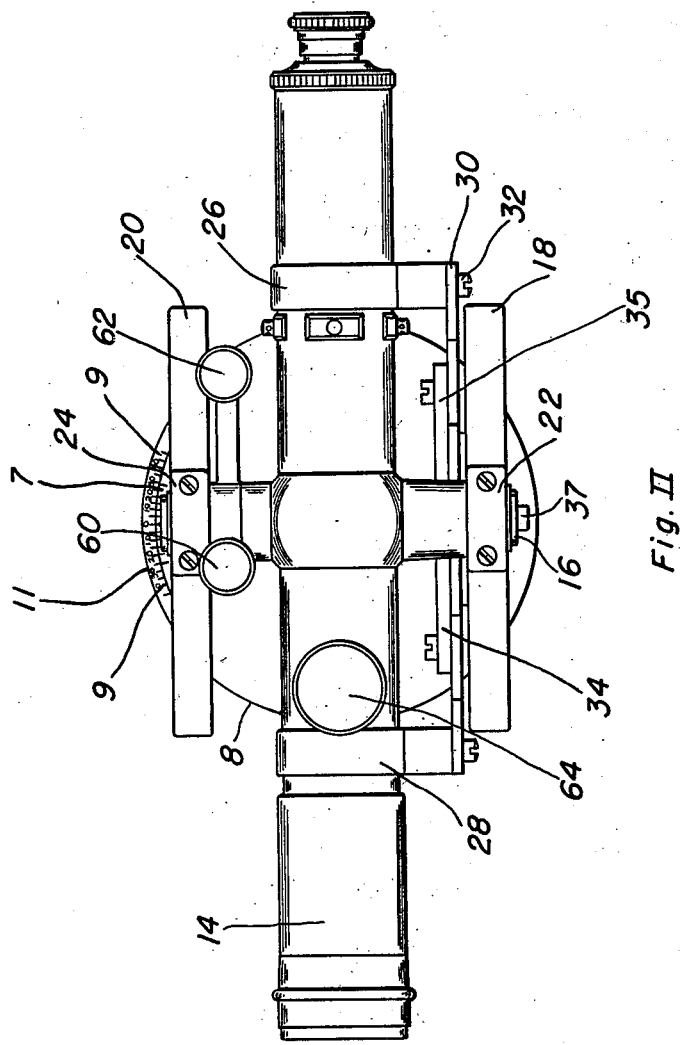
Fig. II
INVENTOR.
CARL W. KEUFFEL
BY

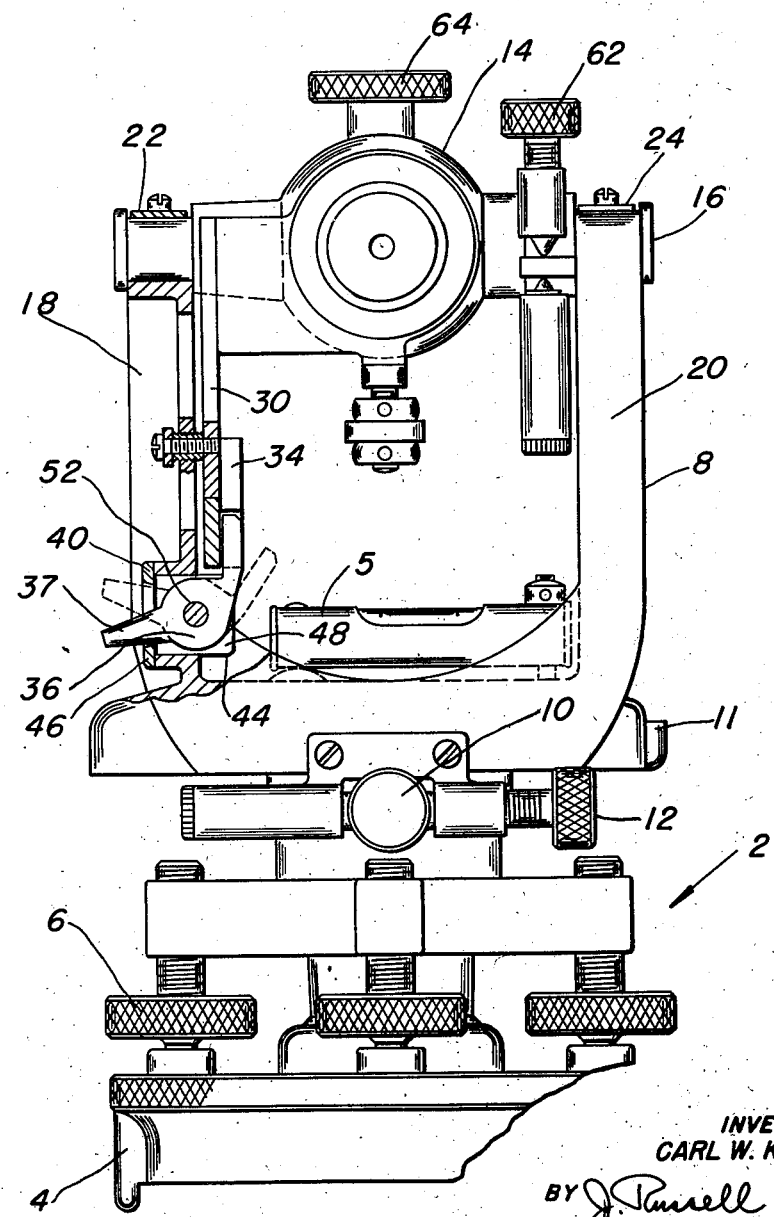

UNITED STATES PATENT OFFICE 2,607,994

LEVEL TRANSIT

Carl W. Keuffel, Bernardsville, N. J., assignor to Keuffel & Esser Company, Hoboken, N. J., a corporation of New Jersey Application December 10, 1947, Serial No. 790,902

3 Claims. (Cl. 33—69)

This invention relates to a type of surveying instrument frequently used in building work. This type of instrument is chiefly used as a level but is also provided with means for reading horizontal and vertical angles when desired.

The principal object of the invention is to provide a simple, rigid, non-straining means for readily locking the telescope in the horizontal position when the instrument is to be used as a level.

This and other objects of the invention and the means for their attainment will be apparent to those skilled in the art from the following description taken in connection with the accompanying drawings and in which:

Figure I is a view in elevation showing the improved instrument.

Figure II is a view in plan showing the improved instrument.

Figure III is a view in front elevation with a portion in section showing the improved instrument.

Figure IV is a view in enlarged elevation showing the locking means looking in the opposite direction from Figure I from a point between the standards of the instrument.

Referring to the drawings, in which the same number always refers to the same part, a levelling head 2 is provided by means of which the instrument may be fastened to a tripod and levelled thereon. The base plate 4 is provided with an internal thread which fits a similar thread on the tripod. The four levelling screws 6 and either the plate level vial 5 or the telescope level vial 3 are used for levelling up the instrument. The alidade 8 is fastened to a center spindle not shown so that it may be turned about the levelling head. The alidade 8 carries a vernier 7 mounted adjacent the horizontal scale 9 provided on the limb plate 11. The vernier 7 and horizontal scale 9 are used to read the horizontal position of the telescope 14, carried by the alidade 8. A clamp operated by the knurled headed screw 10 clamps the alidade 8 in any selected position and the tangent screw 12 is provided for fine adjustment of the alidade's position. The structures of these aforementioned parts may all be in accord with designs well known in the art.

The telescope 14 is rotatably mounted on the alidade 8 by means of the telescope axle 16. In the embodiment shown the telescope 14 rotates through an angle of about 90°. The design may be changed at will to permit greater or less rotation depending on the use to which the instrument is put. The axle 16 rests in recesses provided therefor in each of the standards 18 and 20 of the alidade 8 and is held in place therein by the cover plates 22 and 24.

Two annular members 26 and 28 are secured to the outside of the telescope as for example by means of solder. The telescope level vial 3 is adjustably mounted to the annular members 26 and 28 in a position beneath the telescope. The protractor plate 30 is also secured to the annular members 26 and 28 as by the screws 32. Two arcuate members 34 and 35 are fastened to the inner side of the protractor plate 30 as by the screws 38 so that their lower edges align with the lower edge of the protractor plate. The arcuate members 34 and 35 are spaced apart so as to form a recess at the center of the protractor plate 30. The arcuate members 34 and 35 are adjustably mounted as by fitting the screws 38 in enlarged holes in the members 34 and 35 in order to permit accurate spacing of the members which will determine the position of a recess for receiving a locking lever 36 and the size of the recess. The locking lever 36 is pivotally mounted in the standard 18 so that it may be conveniently rotated from a position in the recess between the arcuate members 34 and 35 to a free position as shown by the dotted lines in Figure III.

In the preferred embodiment the pivot pin 52 about which the locking lever 36 rotates is mounted in the standard on the pivot mount 40 which is fitted into a hole in the standard 18 and secured thereto by the screws 42. The shape of the pivot mount 40 is shown in the views Figure I and Figure IV. The portion 44 which passes through the standard is made to fit accurately into a cylindrical hole in the standard 18. The flange portion 46 fits against the outer surface of the standard 18 and is secured thereto by the screws 42. The cylindrical portion 44 is provided with a vertical slot 48 in which the locking lever 36 closely fits. The cylindrical portion 44 is also provided with a hole 50 running perpendicular to the slot 48 for receiving the pivot pin 52. The hole 50 is threaded on one side of the slot 48 and recessed on the other. The pivot pin 52 is provided with a slotted head on one end fitting the recess at one end of the hole 50 and is threaded on the other end where it engages the threads on the other end of the hole 50. The pin 52 mounts the locking lever 36 for rotation in the slot 48 of the pivot mount 40. It should be realized that the means described for locking the protractor plate 30 to the standard 18 is the preferred means only. A person skilled in the art will be able to devise other means for accomplishing the same result which will be within the scope of the invention.

As is shown in Figure III the locking lever 36 moves into locking position when its finger arm 37 is pushed down and to unlocking position when its finger arm 37 is pushed up (dotted position). The locking lever 36 is made with plano parallel surfaces so that there will be no tendency for it to slip out of the recess the walls of which are formed by the ends of the arcuate members 34 and 35 which walls are also made flat and parallel to the surfaces of the locking lever 36. The telescope 14 is firmly held in a horizontal position when the locking lever 36 is in locking position since the latter acts through the protractor plate 30 on the annular members 26 and 28 which are spaced on either side of the telescope axle 16. The locking action of the locking lever 36 has no tendency to strain the telescope or other parts of the instrument as might be the case if two means joining the telescope 14 and standard 18 were used in addition to the axle 16.

The protractor plate 30 is provided with an angular scale 54 and a vernier plate 56 is attached to the standard 18 as by the screws 58 and 59 in a position adjacent to the angular scale 54. The scale 54 and vernier 56 are used to read the angular elevation or depression of the telescope 14 when the locking lever 36 is used as described. The tangent screw 62 is used for giving the telescope 14 a fine adjustment about the axis 16 when the clamp screw 60 is tightened. The focussing knob 64 is used for focussing the telescope by means of a rack and pinion arrangement not shown. The operations of the clamp screw 60, tangent screw 62 and focussing knob 64 are similar to those on many commercial instruments well known in the art.

Having thus described the invention what is claimed is:

1. In a surveying instrument having an alidade rotatable around a vertical axis and including two standards carrying a telescope at least partially rotatable around a horizontal axis the combination of an arcuate member adjacent to one of said standards secured to said telescope at both of its ends and provided with a recess having parallel walls, a pivot mount having a cylindrical portion fitting in a hole in said standard adjacent to said arcuate member, having a flange whereby said pivot mount may be secured to said standard and having a slot like opening, a locking lever in said slot like opening of said pivot mount formed on one end to fit in the recess with which said arcuate member is provided, said locking lever being formed with a finger piece on its other end and having a hole between its ends to receive a pivot pin and a pivot pin passing through the cylindrical portion of said pivot mount and through the hole provided in said locking lever so that said locking lever may be pivoted at will in and out of the recess with which said arcuate member is provided.

2. In a surveying instrument having an alidade rotatable around a vertical axis and including two standards carrying a telescope at least partially rotatable around a horizontal axis, the combination of an arcuate member adjacent to the inside surface of one of said standards secured to said telescope at both of its ends and provided with a recess having parallel walls and a single locking lever passing through said standard adjacent to said arcuate member and pivoted therein, said locking lever being provided with plano-parallel walls on the end extending inside said standard to fit between the plano-parallel walls of said recess and being formed with a finger piece on the end extending outside of said standard so that the end of said locking lever having plano-parallel walls may be moved manually in a direction perpendicular to the plane of said arcuate member in and out of the recess with which said arcuate member is provided when the axis of said telescope is perpendicular to the axis of the instrument whereby said telescope may be locked in position with its axis perpendicular to the axis of the instrument when the surveying instrument is used as a level.

3. In a surveying instrument having an alidade rotatable around a vertical axis and including two standards carrying a telescope at least partially rotatable around a horizontal axis, the combination of an arcuate member adjacent to the inside surface of one of said standards secured to said telescope at both of its ends, two spaced adjustable members secured to said arcuate member the ends of which form the parallel walls of a recess between the members and a single locking lever passing through said standard adjacent to said arcuate member and pivoted therein, said locking lever being provided with plano-parallel walls on the end extending inside said standard to fit between the plano-parallel walls of said recess and being formed with a finger piece on the end extending outside of said standard so that the end of said locking lever having plano-parallel walls may be moved manually in a direction perpendicular to the plane of said arcuate member in and out of the recess with which said arcuate member is provided when the axis of said telescope is perpendicular to the axis of the instrument whereby said telescope may be locked in position with its axis perpendicular to the axis of the instrument when the surveying instrument is used as a level.

CARL W. KEUFFEL.

REFERENCES CITED

The following references are of record in the file of this patent:

UNITED STATES PATENTS

| Number | Name | Date |
| --- | --- | --- |
| 234,284 | Jackson | Nov. 9, 1880 |
| 798,310 | Wesson | Aug. 29, 1905 |
| 879,008 | Saegmuller | Feb. 11, 1908 |
| 936,915 | Kustner | Oct. 12, 1909 |
| 1,710,057 | Heinrich | Apr. 23, 1929 |
| 1,882,523 | Rothweiler | Oct. 11, 1932 |
| 2,386,432 | Bullock | Oct. 9, 1945 |
| 2,403,919 | Hagner | July 16, 1946 |